United States Patent [19]

Anderson, Jr. et al.

[11] Patent Number: 4,602,657

[45] Date of Patent: Jul. 29, 1986

[54] VALVE MANIFOLD FOR A DIFFERENTIAL PRESSURE TRANSMITTER

[75] Inventors: William L. Anderson, Jr., Houston; Michael E. Moyers, Spring, both of Tex.

[73] Assignee: Anderson-Greenwood & Co., Bellaire, Tex.

[21] Appl. No.: 700,539

[22] Filed: Feb. 11, 1985

[51] Int. Cl.[4] .......................................... F16K 11/087
[52] U.S. Cl. .................................. 137/595; 137/597; 137/625.19; 73/4 R
[58] Field of Search ............... 137/595, 597, 625.16, 137/625.19, 625.15, 625.18, 312, 625.47; 73/3, 4 R

[56] References Cited

U.S. PATENT DOCUMENTS

| | | | |
|---|---|---|---|
| 2,871,881 | 2/1959 | Hewson | 137/597 |
| 3,108,614 | 10/1963 | Navara | 137/625.47 X |
| 3,381,532 | 5/1968 | Tausch | 73/861.52 |
| 3,450,157 | 6/1969 | Hewson | 137/595 |
| 3,596,680 | 8/1971 | Adams | 137/597 |
| 3,894,559 | 7/1975 | De Puy | 137/595 |
| 4,355,659 | 10/1982 | Kelchner | 137/625.19 |
| 4,365,563 | 12/1982 | Wu | 137/625.18 X |

Primary Examiner—Martin P. Schwadron
Assistant Examiner—Stephen M. Hepperle
Attorney, Agent, or Firm—Vinson & Elkins

[57] ABSTRACT

A valve manifold (18) between a main flow line (10) and a differential pressure transmitter (24) having a body (40) with a bore (48) in which three spherical ball valve members (72, 74, 76) are mounted for rotation among run, zero and calibration positions. A low pressure calibrating port (28) and a high pressure calibrating port (46) are controlled by calibration valve member (76). Low pressure calibrating port (28) is connected to a source of a predetermined low pressure calibrating fluid and high pressure calibrating fluid port (46) is connected to a source of a predetermined high pressure calibrating fluid to calibrate transmitter (24) between any desired low pressure and high pressure ranges. Low pressure calibrating port (28) and high pressure calibrating port (46) may be selectively connected to atmospheric pressure if desired and the calibrating fluids may be controlled from a remote control site (26).

21 Claims, 16 Drawing Figures

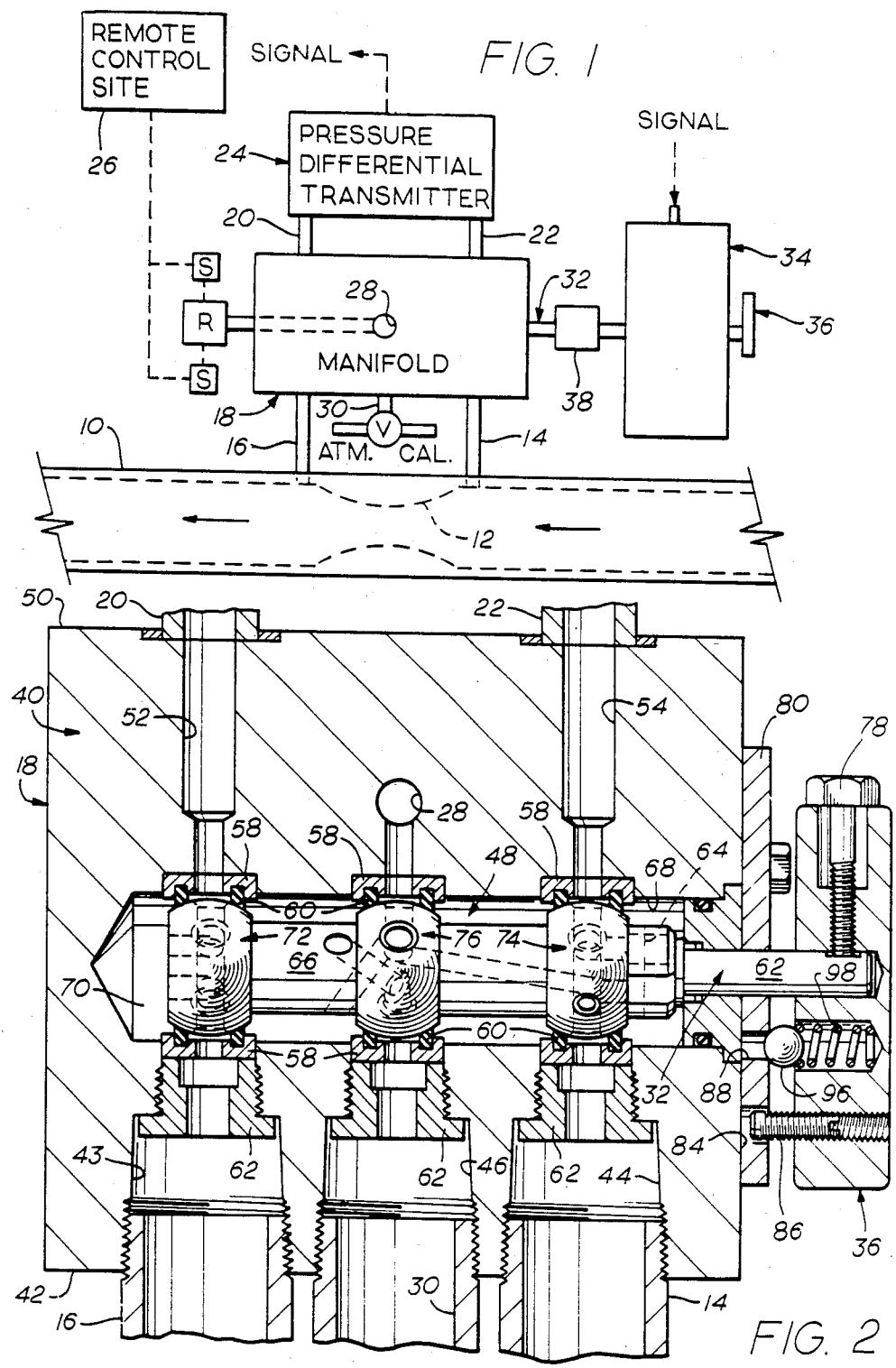

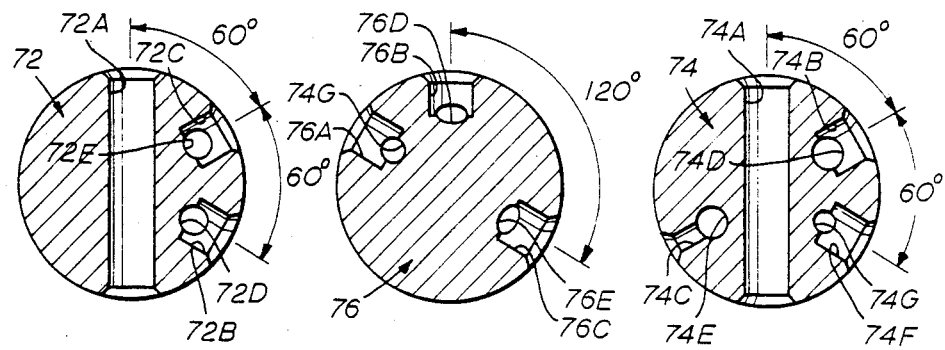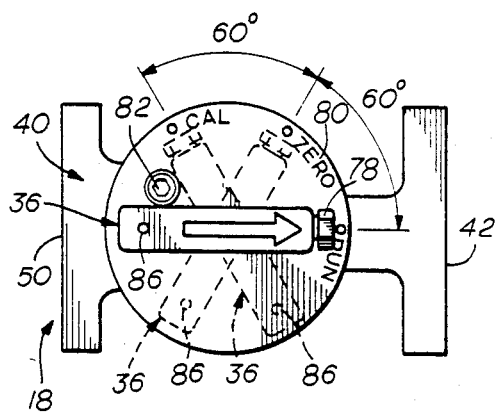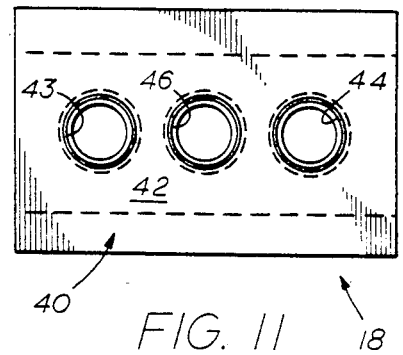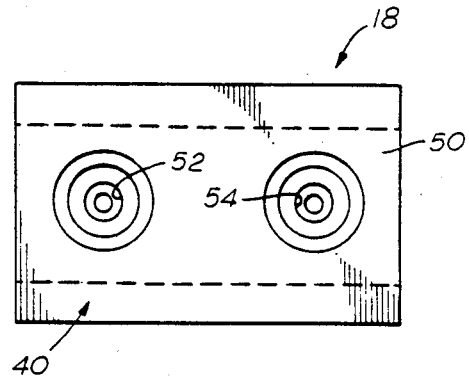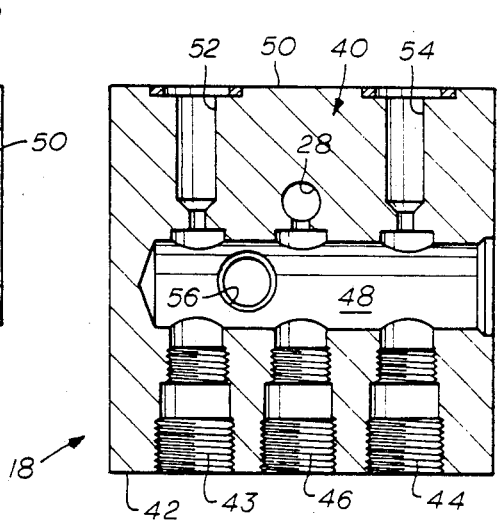

RUN POSITION

ZERO POSITION

CALIBRATING POSITION

VALVE MANIFOLD FOR A DIFFERENTIAL PRESSURE TRANSMITTER

BACKGROUND OF THE INVENTION

This invention relates to a valve manifold placed between a main flow line and a differential pressure transmitter to control the flow of high and low fluid pressures from the main flow line to the transmitter.

Normally, a flow restriction is placed in a main flow line for conveying a fluid and pressure taps are made on each side of the restriction for obtaining a high and low fluid pressure. Such a flow restriction may comprise an orifice plate, flow nozzle, or venturi tube, for example. The high and low pressures taken from opposed sides of the restriction in the main flow line are communicated to the transmitter for receiving the fluid pressure differential and transmitting the measured pressure differential by a suitable electronic signal or the like to a remote location, such as a control room, where the pressure differential may be monitored and/or recorded by an operator.

The differential pressure transmitter may be a direct reading instrument such as a manometer, or a differential pressure cell producing an output signal corresponding to the difference in pressures observed, the output signal being applied as the input to either a local or remote indicator or recorder registering either the pressure differential or a variable, such as a flow rate, which is a function of the pressure differential. However, this invention is particularly adaptable for use with a transmitter which transmits the differential pressure by an output signal to a remote location such as a control room where an operator may monitor the pressure differential in the flow line. This invention could also be used with differential pressure chart recorders.

Valve manifolds have been utilized heretofore to control the flow of fluid pressures between a differential pressure transmitter and a main flow line in which the fluid pressure differential is desired to be measured.

For example, the U.S. Pat. No. 3,450,157 dated June 17, 1969 and issued to John E. Hewson shows a valve manifold between a pipeline and a measuring instrument or transmitter with the manifold having a body and a pair of rotatable ball valves therein mounted on a stem which is actuated by a handle positioned outside the manifold body. Slots are provided in the ball valve members of Hewson so that both sides of a metering chamber are exposed to the high pressure for an instant prior to the rotation of the ball valve members to the fully open position, thereby to obtain increased meter accuracy and also to prevent damage to the metering device. FIG. 5 of Hewson shows the run position directing the high and low fluid pressures to the transmitter, and FIG. 6 shows the off position in which the high and low pressure ports from the measuring device or transmitter are vented to atmosphere. However, there is no showing of a separate calibration position for calibrating the manifold to a desired fluid pressure range.

U.S. Pat. No. 3,894,559 dated July 15, 1975 and issued to Leland Q. DePuy also shows a manifold adapted to be positioned between a process line or the like and a differential pressure sensing or reading instrument. The manifold of DePuy has a body with a pair of spaced ball valve members mounted on a stem for rotation, and positioned within an enlarged bore on the body which defines a fluid chamber between the stem and the bore surfaces. The ball valve members are rotatable between three settings: a first setting in a process mode, a second setting in a zero mode, and a third setting in a calibration mode. The stem is manually rotated for movement of the valve members among the three separate settings. In the process or run mode, the high and low passages of the valve members are aligned with the inlet and outlet ports of the manifold. In the calibration mode, the transmitter or measuring instrument is placed out of operating condition by having spherical surface portions of the valve members covering both the inlet and outlet ports within the valve to isolate the ports from each other. In the zero mode, high pressure from the inlet of the main flow line is communicated through the main bore space and to both the instrument high and low outlet ports, and thence to the pressure differential transmitter for applying a zero differential pressure for zero checking. It is noted that the calibration setting or mode blocks both inlet ports and both outlet ports to isolate the ports from each other. Again, there is no showing of a separate calibration position for calibrating the manifold to a predetermined fluid pressure range or to atmospheric pressure if desired.

U.S. Pat. No. 3,596,680 dated Aug. 3, 1971 issued to Donald L. Adams and is another example of a differential pressure device including a manifold utilizing two tapered plug valves which are movable between four basic positions: a normal operating or run position, a zero position, a calibration position, and a blowdown position. For calibrating the differential pressure transmitter to a predetermined differential pressure, a pair of cap screws must be manually removed from calibrating inlets, and calibrating pressure lines manually attached to such calibrating inlets thereby requiring a workman at the site of the manifold for calibration of the transmitter. Other known prior art is not believed to be any more pertinent than the above mentioned references.

SUMMARY OF THE INVENTION

This invention is directed to a valve manifold between a process flow line and a differential pressure transmitter, the manifold being selectively moved among three separate settings or positions: a run position, a zero position, and a calibration position. The present manifold is particularly constructed so that it may effect a calibration for a predetermined pressure range by remote control from a remote location so that it is not necessary for an operator or workman to be present at the site of the manifold or differential pressure transmitter in order to change the range of calibration from one range to another range. The calibration for the low fluid pressure is normally at zero, but the calibration for the differential high fluid pressure may vary, for example, from ten (10) inches of water to one hundred (100) inches of water, depending upon the particular type of product being conveyed through the flow line. With some products, it might be desirable to have the range from zero to forty (0-40) inches of water, whereas with another product it might be desirable to have a pressure differential range from zero to eighty (0-80) inches of water.

Of course, the zero setting could be under pressure of the product in the flow line or at atmosphere, and might vary, for example, from 100 psi to 1000 psi, depending on the product being transported in the flow line. Thus, by opening or closing a valve in the calibration line to the manifold of this invention by a suitable electronic signal or the like from a remote location after the setting of the manifold in the calibration position, the range of the pressure differential transmitter can be set to any desired range without the necessity of having a person on site.

The present invention is carried out by an improved valve manifold having a plurality of valve elements and porting associated with such valve elements to permit the pressure differential transmitter to be set by separate low and high pressure calibration fluids at any predetermined range. The embodiment illustrated uses a valve manifold having a central bore and three valve members with separate low pressure and high pressure calibration ports communicating with the bore. In addition to a pair of high and low pressure valve members, a novel third valve member is provided to control the flow of calibration fluid from the calibration ports for calibration of the pressure differential transmitter at a desired predetermined range.

The improved valve manifold has a stem which may be selectively rotated among three separate settings or rotational positions: namely, a first run position, a second zero position, and a third calibration position.

The stem is mounted within an enlarged central bore and a fluid chamber is formed in the void volume of the bore adjacent the stem. The three separate valve members are mounted within the bore and operatively connected to the stem for movement in response to the rotation of the stem among the three settings. The calibration valve member permits fluid communication between the calibration inlet port and the high pressure outlet port in the calibration setting for calibration of a transmitter at a predetermined high amount, and blocks fluid communication between the calibration inlet port and the high pressure outlet port in the run position setting. The stem has a passageway therein between the high pressure valve member and the calibration valve member at the calibration position to permit fluid communication between the calibration inlet port and the high pressure outlet port.

The calibration valve member also controls the venting of the fluid chamber in the bore to atmosphere or other desired pressure and blocks such venting in the zero position setting but permits such venting at the calibration position setting and at the run position setting. In the calibration position setting, the low pressure outlet to the transmitter is in fluid communication with the fluid chamber and thus the transmitter may be calibrated for low pressure also. In the run position setting, the venting of the fluid chamber to atmosphere permits the detection of any leaks from the high and low pressure lines into the fluid chamber.

Thus, with the manifold having a third valve member, it is possible to have two separate predetermined calibration signals provided automatically in the calibration position to both the low pressure side and high pressure side of the transmitter.

In a preferred embodiment of the manifold, the valve members comprise spherical ball valve elements mounted on the stem in spaced relation for rotation with the stem among the three separate settings or positions. The calibration ball member has three ports therein, each communicating with a transversely extending fluid passageway in the stem. Two of the ports are vent ports in fluid communication with the fluid chamber within the bore, while a third port extends to a fluid passageway in the stem to the high pressure ball member for calibration of the transmitter at a predetermined high fluid pressure.

While the embodiment shown illustrates a handle which is manually rotated for moving the stem and valve members among the separate settings, it is to be understood that an operator, such as an electrically actuated operator, could be connected to the stem and controlled by a suitable signal from a remote location. This would be desirable for remote operation of the manifold, including the calibration of the pressure differential transmitter to a predetermined range, without requiring the presence of an workman at the site of the transmitter.

It is noted that upon rotation of the stem between the run position and the calibration position, the zero position must be passed. In the zero position, the high and low outlet pressures to the pressure differential transmitter are equalized by a small opening in the high pressure ball valve element which permits the high side of the transmitter to be initially pressurized and fluid pressure on both sides of the pressure sensing bellows to be equalized before the introduction of high pressure, thereby to avoid damage to the pressure differential transmitter upon any return to the run position. Further, in the run position, an atmospheric vent is open to the fluid chamber in the bore and this can be utilized for detection of leaks into the fluid chamber from the high and low pressure lines.

An object of this invention is to provide a valve manifold between a main flow line and a differential pressure transmitter which will permit calibration of the pressure differential transmitter for any desired predetermined pressure range.

A further object is to provide such a valve manifold which will permit calibration of a pressure differential transmitter for any desired pressure range from a location remote from the site of the transmitter without requiring an operator or workman to be present at the site for adjusting the transmitter to the desired pressure range.

A further object is to provide such a manifold having valve members mounted in a central bore and movable between three settings: a run position setting, a zero position setting, and a calibration position setting, with the calibration setting permitting the communication of a calibration fluid to the high pressure inlet of the pressure differential transmitter while permitting, if desired, communication of the low pressure inlet outlet of the transmitter to atmosphere.

Another object is to provide a manifold which may be positioned at three distinct settings and providing in the run position setting an atmospheric vent to the fluid chamber in the central bore of the manifold which may be maintained in open position to provide an automatic leak detection.

It is to be understood that the objects of this invention can be carried out in a valve manifold with different types of valve elements and with different types of settings, if the porting associated with such valve elements is such that separate high and low pressure calibration fluids are provided for calibrating the pressure differential transmitter at any predetermined pressure differential range, and particularly if the pressure differential range can be adjusted or changed from a remote location without requiring a workman to be present on site.

DESCRIPTION OF INVENTION

Other objects and advantages will appear from the following description in the drawings, wherein:

FIG. 1 is a schematic of a differential pressure measuring system showing the valve manifold forming this invention between a main flow line and a pressure differential transmitter to regulate the fluid flow between the main flow line and the transmitter for measurement;

FIG. 2 is an enlarged section of the valve manifold shown in FIG. 1 showing the manifold body and stem with valve members mounted thereon for rotation therewith, the manifold illustrated for manual operation;

FIG. 7 is a sectional view taken generally along line 7—7 of FIG. 6 and showing the high pressure valve member;

FIG. 8 is a sectional view taken generally along line 8—8 of FIG. 6 and showing the calibration valve member;

FIG. 9 is a section taken generally along line 9—9 of FIG. 6 and showing the low pressure valve member;

FIG. 10 is an end elevational view of the valve manifold showing a handle for rotating the stem and associated valves among three rotational settings or positions indicated on the adjacent mounting plate;

FIG. 11 is an elevational view of the side of the manifold body shown in FIG. 10 which is adjacent the main flow line and illustrating three ports which communicate with a central bore in the manifold body;

FIG. 12 is a side elevational view of the side of the manifold shown in FIG. 10 which is adjacent the pressure differential transmitter and showing the low and high pressure ports to the transmitter;

FIG. 13 is a transverse section through the manifold body with the stem and associated structure removed from the manifold body;

Figure 3:
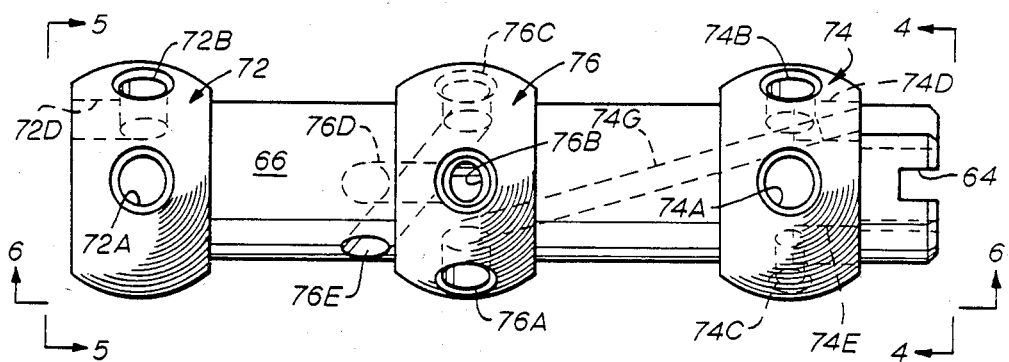
FIG. 3 is an elevational view of an enlarged stem portion and valve members thereon removed from the manifold.
Figure 4:
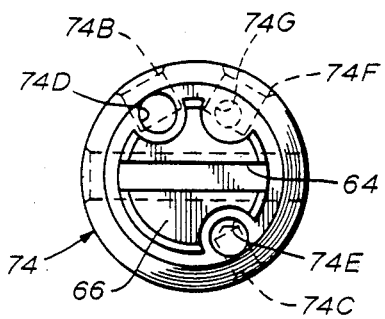
FIG. 4 is an end view of the enlarged stem portion of FIG. 3 looking along the line 4—4 of FIG. 3.

Referring now to the drawings for a better understanding of this invention, and more particularly to FIG. 1 in which a pressure differential measuring system is shown schematically, a main flow line is indicated at 10 having a flow restriction 12 therein which provides a fluid pressure drop as well known. Flow restriction 12 may be in the form of an orifice plate, flow nozzle, or venturi tube, for example. A high pressure line 14 extends from a high pressure tap on the high pressure side of restriction 12, and a low pressure line 16 extends from a pressure tap on the low pressure side of restriction 12. High and low pressure lines 14 and 16 are in fluid communication with a valve manifold indicated generally at 18.

Valve manifold 18 regulates the fluid flow from flow line 10 and supplies the low and high fluid pressures to be measured through a low pressure outlet line 20 and a high pressure outlet line 22 to a pressure differential transmitter indicated generally at 24. The differential fluid pressure received by transmitter 24 may be transmitted by an electronic signal or the like to a remote control site such as indicated at 26 where the pressure differential may be monitored or recorded by an operator. Manifold 18 is adapted to calibrate transmitter 24 to any desired predetermined low fluid pressure and to any desired predetermined high fluid pressure thereby to provide a pressure differential transmitter readily adjusted to any desired predetermined range. Thus, the transmitter is readily adaptable to flow lines having varying operating conditions and pressures, as well as different products being transported through the flow line.

Manifold 18 includes a low pressure calibration and vent port shown at 28 which is connected to a source of calibration fluid, such as might be supplied by a reservoir R controlled, for example, by suitable regulators which may be actuated through solenoids S from remote control site 26. Thus, calibrating fluid at a predetermined fluid pressure is supplied to port 28 for calibration of the low pressure side of transmitter 24. Port 28 is selectively communicated to atmosphere as a vent.

For calibrating the high pressure side of transmitter 24 at a predetermined high fluid pressure a high pressure calibrating conduit is shown at 30 having a suitable valve V therein. The high pressure side of transmitter 24 may be calibrated at atmospheric pressure if desired upon a suitable opening of valve V to atmosphere. If desired, a separate source of calibrating fluid may be provided through a high pressure calibrating and vent line 30 for calibrating pressure differential transmitter 24 at a predetermined high fluid pressure. The calibration fluid could be supplied, as is the low pressure fluid, by a suitable reservoir and regulators which could be controlled from a remote location. Valve V may be a three way valve, for example, and would be open to the high pressure calibrating fluid while closed to atmosphere. Valve V could likewise be movable between several positions by solenoids or the like from remote control site 26.

Manifold 18 has suitable valving connected to a stem indicated generally at 32 mounted for rotation among predetermined positions to effect movement of the valving members to desired positions. The rotation of stem 32 among three positions: namely, a run position, a zero position, and a calibration position, may be provided automatically by a pneumatic or electric operator indicated generally at 34. Operator 34 could be controlled by electric signals or the like from remote control site 26 by energizing solenoids or the like, as is well known. A manual handle indicated generally at 36 may be used to override operator 34 in the event it is desired to operate or rotate stem 32 manually. A suitable clutching arrangement 38 may be provided for disengagement of the operator 34, when it is desired to operate the system manually.

While a pressure differential measuring system as indicated schematically in FIG. 1 has been utilized generally heretofore, none of such systems has provided a manifold which would permit a pressure differential transmitter to be calibrated both at a predetermined high fluid pressure and at a predetermined low fluid pressure, and particularly such a system which is adapted for control from a remote location without requiring a workman at the site of the manifold or pressure differential transmitter. Oftentimes, the site of the transmitter may be inaccessible, and it is desirable that such a system be adapted for such a remote or inaccessible location. Manifold 18 comprising the present invention is particularly adapted for such a system.

Referring now to FIGS. 2-16 for a description of manifold 18, a manifold body is generally indicated at 40 with the side or face 42 adjacent main flow line 10 having three inlet ports therein, a low pressure inlet port 43, adapted for connection to low pressure line 16, a high pressure inlet port 44 adapted for connection to high pressure line 14, and a combined vent and high pressure calibration port 46 adapted for connection to vent line 30 which is also utilized for high pressure calibration fluid. Ports 43, 44, and 46 communicate with a main central bore 48 formed in body 40.

The opposite face or side 50 of manifold body 40 is disposed adjacent transmitter 24 and has a pair of outlet ports therein, low pressure outlet port 52 adapted for connection to low pressure line 20 and high pressure outlet port 54 adapted for connection to high pressure line 22 to transmitter 24. The low pressure calibration port 28 is shown between outlet ports 52 and 54. All of the ports 28, 52, and 54 communicate with main central bore 48. As shown in FIG. 13, a bottom port 56 may be provided in communication with central bore 48 for drain or test purposes and may be connected with a suitable drain line or end plug, as desired.

As shown particularly in FIG. 2, each of ports 28, 43, 44, 46, 52 and 54 has a suitable valve seat 58 and associated resilient sealing rings 60 at its respective juncture with main bore 48. Threaded end plugs 62 maintain the sealing rings 60 in sealing engagement with the adjacent members of the valving elements.

The valve stem generally indicated at 32 comprises a small diameter end portion 62 having a key on its inner end fitting within an end slot 64 of an enlarged diameter stem portion 66 which is received within central bore 48. A void space is formed in bore 48 between stem 32 and the bore wall or surfaces defined at 68 and such void space forms a fluid chamber 70. Three spherical ball valve members are mounted on enlarged diameter stem portion 66 comprising a low pressure ball valve member generally indicated 72, a high pressure ball valve member generally indicated 74, and an intermediate calibration ball valve member generally indicated 76 between the end valve members 72 and 74.

As shown particularly in FIG. 2 and FIG. 10, handle 36 has a lock bolt 78 engaging a flat portion on stem end portion 62 to secure handle 36 thereon. A locking mounting plate 80 is secured to manifold body 40 and has indicia thereon indicating the three settings or positions: namely, the run position, the zero position, and the calibration position.

A stop screw 82 engages handle 36 in the run position as shown in FIG. 10, and handle 36 is rotated sixty degrees (60°) to the zero position, and then another sixty degrees (60°) to the calibration position. In the calibrating position, handle 36 likewise engages stop screw 82 to limit the rotation threat. At each of the three positions, an opening 84 in plate 80 is provided and a threaded screw lock 86 is in alignment with opening 84 at each of the positions. Threaded lock 86 may be engaged by a screwdriver or the like to withdraw or extend its extending end from opening 84. For positioning handle 36 accurately at each of the three positions, a positioning aperture or opening 88 is provided at each of the three positions and engages a ball valve detent 90 urged into engagement with opening 88 by spring 98. In the event handle 36 is used with an automatic operator, then screw lock 86 would not be utilized. If desired, handle 36 could be padlocked in any desired position.

Referring now particularly to FIGS. 3-9, the porting arrangement of valve members 72, 74 and 76 along with enlarged stem portion 66 is illustrated in detail. Low pressure ball valve member 72 as shown particularly in FIGS. 4 and 9 has a central bore shown at 72A, and a pair of ports 72B and 72C in fluid communication with fluid chamber 70 through respective fluid passages 72D and 72E. Ports 72B and 72C are in fluid communication with fluid chamber 70 at all times.

Figure 5:
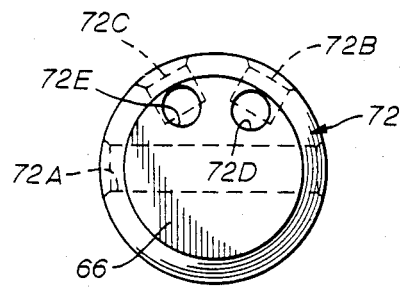
FIG. 5 is an end elevational view of the stem portion of FIG. 3 looking generally along the line 5—5 of FIG. 3.
Figure 15:
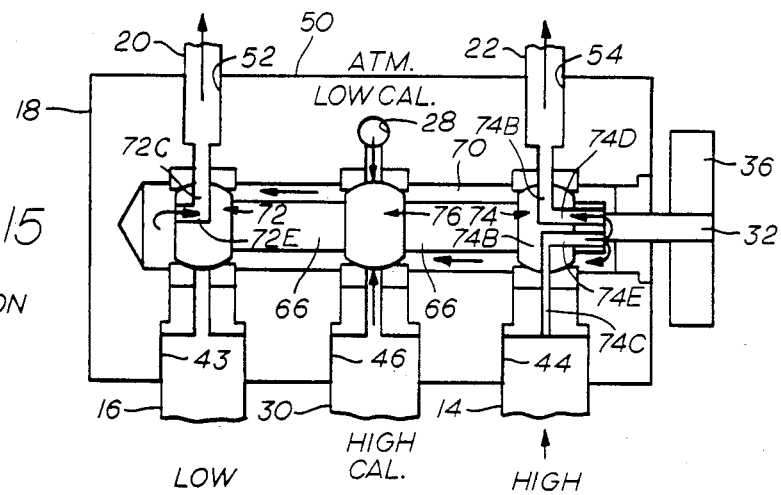
FIG. 15 is a schematic plan view similar to FIG. 14 but showing the stem and valve members in the zero position.

High pressure ball valve member 74 as shown particularly in FIG. 5 and FIG. 7 has a central bore 74A, and a pair of ports 74B and 74C which are in fluid communication with fluid chamber 70 at all times through respective fluid passages 74D and 74E. Fluid passage or opening 74C in high pressure valve element 74 is of a restricted cross sectional area or size as shown in FIG. 7 and in FIG. 15 diagrammatically and permits a pressurized fluid flow to both low pressure outlet port 52 and high pressure outlet port 54 in zero position thereby to equalize fluid pressure on both sides of the pressure sensing bellows of transmitter 24. A calibration port is shown at 74F which communicates with fluid passage 74G extending through enlarged stem portion 66 to calibration valve member 76.

Figure 6:
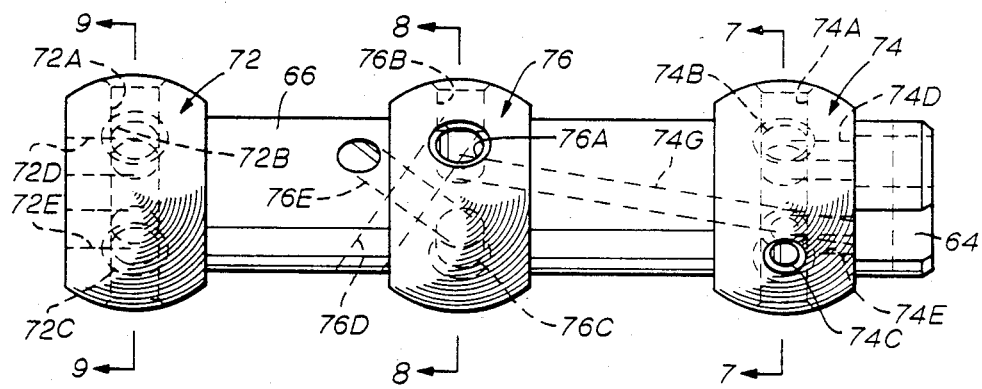
FIG. 6 is a side elevational view of the stem portion of FIG. 3 looking generally along the line 6—6 of FIG. 3.

Calibration ball valve member 76 as shown in FIG. 8 has a calibration port 76A which is in fluid communication with fluid passage 74G extending through enlarged stem portion 66 to port 74F in high pressure ball valve member 74. It is noted that the open end of fluid passage 74G adjacent high pressure ball element 74 required for drilling is plugged so that passage 74G does not communicate with chamber 70. Ports 76B and 76C are in fluid communication with valve chamber 70 at all times through respective fluid passages 76D and 76E which extend through enlarged stem portion 66 as shown in FIGS. 3 and 6 to fluid chamber 70.

Run Position Operation

Figure 14:
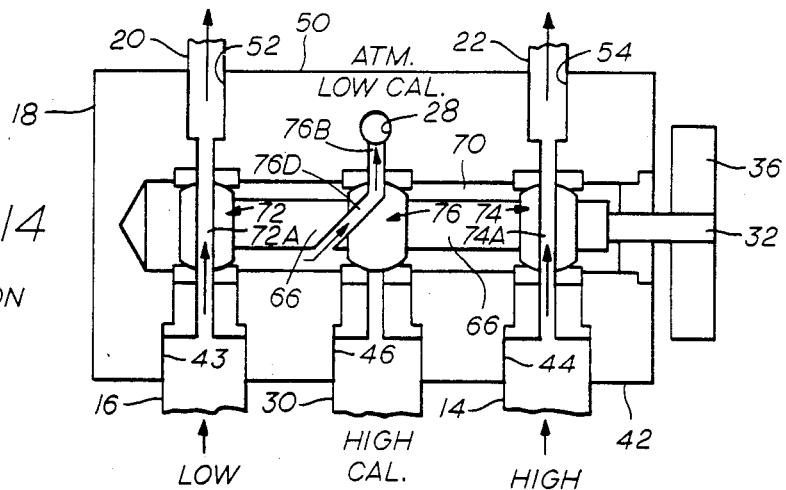
FIG. 14 is a schematic plan view of the manifold showing the stem and valve members in the run position.
Figure 16:
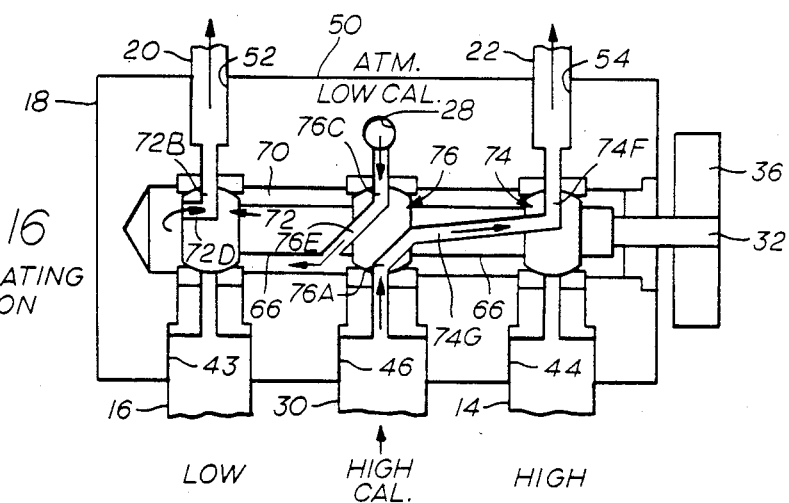
FIG. 16 is a schematic plan view similar to FIGS. 14 and 15 but showing the stem and valve members in the calibrating position in which the pressure differential transmitter is calibrated for low and high pressures.

In operation, and referring particularly to FIGS. 14, 15, and 16 in which the functioning of the valve manifold 18 is shown schematically in the three separate rotational positions, the run position is shown in FIG. 14, the zero position is shown in FIG. 15, and the calibration position is shown in FIG. 16. First, referring to FIG. 14 and the run or operating position, high pressure fluid from main flow line 10 through line 14 is in direct fluid communication with pressure differential transmitter 24 through main port 74A of high pressure valve member 74. Low pressure fluid from flow line 10 through low pressure line 16 is communicated directly to fluid pressure differential transmitter 24 through central bore 72A of low pressure valve member 72. In the run position, calibration valve member 76 is closed to fluid pressure from high pressure calibrating line 30, but vents fluid chamber 70 to atmosphere through fluid passage 76D, port 76B, and low pressure or vent line 28. Low pressure or vent line 28 may be opened to atmosphere or closed, and may be used to detect any fluid pressure leakage into fluid chamber 70 from the low and high pressure lines from flow line 10 to pressure differential transmitter 24.

Zero Position Operation

FIG. 10 shows handle 36 in solid lines in the run position of FIG. 14. Upon rotation of handle 36 in a counterclockwise direction of a sixty degree (60°) arc from the solid line position of FIG. 10, handle 36 is in the zero position with detent 96 in a suitable opening 88 and lock screw 86 in locking engagement with an associated aligned opening 84, if desired. In the zero position as shown in FIG. 15, fluid pressure from high pressure line 14 is communicated to both the low and high pressure lines 20, 22 of pressure differential transmitter 24 so that high pressure is transmitted to the low and high pressure sides of transmitter 24 before manifold 18 is moved to the calibration position where the differential fluid pressure is measured. This prevents possible over ranging of transmitter 24.

In the zero position, high pressure fluid from line 14 is transmitted to fluid chamber 70 through port 74C and fluid passage 74E, thence from fluid chamber 70 through flow passage 72E and port 72C to the low pressure side of transmitter 24 through line 20. High fluid pressure is likewise communicated from fluid chamber 70 through fluid passage 74D and port 74B to the high pressure side of transmitter 24 through high pressure line 22. In this position, transmitter 24 is fluid balanced by high pressure fluid from line 10. Calibration valve member 76 closes low pressure calibration and vent port 28, and high pressure calibration line 30 to fluid chamber 70 so that fluid chamber 70 is at the same fluid pressure as the high fluid pressure in flow line 10 and high pressure line 14.

Calibration Position Operation

Next, handle 36 is rotated to the calibration position by rotating stem 32 in a counterclockwise direction as viewed in FIG. 10 through an arc of sixty degrees (60°) in which position handle 36 engages stop 82 and ball detent 96 is suitably positioned within an associated opening 88. In the calibration position shown in FIG. 16, transmitter 24 is supplied with calibrating fluid from two separate sources, one a high pressure calibration fluid from line 30 to high pressure line 22 of transmitter 24, and the other a low pressure calibration fluid from port 28 to low pressure line 20. The low pressure calibration fluid may be either atmospheric or a separate low pressure calibration fluid supplied through port 28 to the low pressure side of transmitter 24 through low pressure line 20. The predetermined high fluid pressure through line 30 is communicated to high pressure line 22 through port 76A, fluid passage 74G, and port 74F in high pressure valve member 74 for calibrating transmitter 24 at a predetermined high amount. The low pressure calibration fluid through vent or low pressure calibration port 28 is transmitted through port 76C, fluid passage 76E to fluid chamber 70, and thence through fluid passage 72D and port 72B to low pressure line 20 of transmitter 24.

Thus, the present invention permits a pressure differential transmitter to be set for any predetermined pressure range utilizing, if desired, separate predetermined high pressure and low pressure calibration fluids which are transmitted to the transmitter. Valve V in vent line 30 as shown in FIG. 1 may be controlled from a remote location to permit selectively either atmospheric or other desired high pressure calibration fluid to transmitter 24. A workman is not required at the site of the manifold and pressure differential transmitter to remove plugs, or connect other lines in order to change a pressure range after it has been set as this may be accomplished from a remote location.

What is claimed is:

1. A valve manifold adapted to be positioned between a main flow line in which a differential fluid pressure is to be measured and a differential pressure transmitter to control fluid flow through high and low pressure lines from the main flow line to the transmitter comprising:

a body having a central main bore therein;

a pair of inlet ports communicating with said main bore and connected to high and low pressure lines from the main flow line to provide a low pressure inlet port and a high pressure inlet port;

a pair of outlet ports communicating with said main bore and connected to high and low pressure lines to said differential pressure transmitter to provide a low pressure outlet port and a high pressure outlet port;

a stem mounted within said bore having an end thereof extending outwardly from said body;

means to rotate said stem among three rotational settings including a run position setting, a zero position setting, and a calibration position setting;

three separate valve members mounted within said bore and operatively connected to said stem for movement in response to the rotation of the stem among said three settings, one of said separate valve members being a low pressure valve member permitting direct fluid communication between the low pressure inlet and outlet ports in the run position setting to provide low fluid pressure directly from the flow line to the transmitter, and blocking direct fluid communication between the low pressure inlet and outlet ports in the zero and calibration settings;

a second of said separate valve members being a high pressure valve member permitting direct fluid communication between the high pressure inlet and outlet ports in the run position setting to provide high fluid pressure directly from the flow line to the transmitter, and blocking direct fluid communication between the high pressure inlet and outlet ports in the zero and calibration settings;

a calibration inlet port in said body adapted to be selectively connected to a predetermined calibration fluid pressure for calibration of the transmitter to a predetermined high pressure amount; and a third of said separate valve members being a calibration valve member permitting fluid communication between the calibration inlet port and the high pressure outlet port in the calibration setting for calibration of the transmitter at a predetermined high amount, and blocking fluid communication between the calibration inlet port and the high pressure outlet port in the run position setting.

2. A valve manifold as set forth in claim 1 in which said valve members are mounted on said stem in spaced relation along the stem, and a fluid chamber is provided in said bore between the stem and the adjacent surfaces defining said bore.

3. A valve manifold as set forth in claim 2 wherein said stem has a passageway therein between said high pressure valve member and said calibration valve member to provide fluid communication at said calibration position setting between said calibration inlet port and said high pressure outlet port.

4. A valve manifold as set forth in claim 2 wherein said calibration valve member has a vent port in fluid communication with said fluid chamber in said bore, and said valve manifold body has a vent port therein adjacent said calibration valve member to selectively vent said fluid chamber to atmosphere, said calibration valve member blocking said body vent port in said zero position setting but permitting fluid communication between said fluid chamber, said valve vent port, and said body vent port at said calibration position setting.

5. A valve manifold as set forth in claim 2 wherein said body has a vent to atmosphere in selective fluid communication with said fluid chamber, and said calibration valve member is positioned between said fluid chamber and said vent to permit selectively the venting of the fluid chamber to atmosphere.

6. A valve manifold as set forth in claim 5 wherein said vent may be selectively open to atmosphere or closed, said vent when open in the run position setting permitting the detection of any fluid pressure leaks from said high and low fluid pressure lines into said fluid chamber.

7. A valve manifold adapted to be positioned between a main flow line in which a differential fluid pressure is to be measured and a differential pressure transmitter to control fluid flow through high and low pressure lines from the main flow line to the transmitter comprising:
  a body having a central main bore therein;
  a pair of inlet ports communicating with said main bore and connected to high and low pressure lines from the main flow line to provide a low pressure inlet port and a high pressure inlet port;
  a pair of outlet ports communicating with said main bore and connected to high and low pressure lines to said differential pressure transmitter to provide a low pressure outlet port and a high pressure outlet port;
  a stem mounted within said bore having an end thereof extending outwardly from said body;
  means to rotate said stem among three rotational settings including a run position setting, a zero position setting, and a calibration position setting;
  three separate valve members mounted in axially spaced relation along said stem for movement therewith, one of said separate valve members being a low pressure valve member permitting direct fluid communication between the low pressure inlet and outlet ports in the run position setting to provide low fluid pressure directly from the flow line to the transmitter;
  a second of said separate valve members being a high pressure valve member permitting direct fluid communication between the high pressure inlet and outlet ports in the run position setting to provide high fluid pressure directly from the flow line to the transmitter;
  a calibration inlet port in said body adapted to be selectively connected to a predetermined calibration fluid pressure for calibration of the transmitter at a predetermined fluid pressure; and
  a third of said separate valve members being a calibration valve member permitting fluid communication between the calibration inlet port and one of the pressure outlet ports for calibration of the transmitter at a predetermined fluid pressure and blocking fluid communication between the calibration inlet port and high outlet port in the run position setting.

8. A valve manifold as set forth in claim 7 wherein said valve members are spherical valve members.

9. A valve manifold adapted to be positioned between a main flow line and a differential pressure transmitter to control fluid flow through high and low pressure lines from the main flow line to the transmitter comprising:
  a body having a central main bore therein;
  a pair of inlet ports communicating with said main bore and connected to high and low pressure lines from the main flow line to provide a low pressure inlet port and a high pressure inlet port;
  a pair of outlet ports communicating with said main bore and connected to high and low pressure lines to said differential pressure transmitter to provide a low pressure outlet port and a high pressure outlet port;
  a stem mounted within said bore having an end thereof extending outwardly from said body;
  means to rotate said stem among three rotational settings including a run position setting, a zero position setting, and a calibration position setting;
  three separate valve members mounted within said bore and operating connected to said stem for movement therewith upon rotation of the stem among said three settings, one of said separate valve members being a low pressure valve member and permitting direct fluid communication between the low pressure inlet and outlet ports in the run position to provide a low fluid pressure directly from the flow line to the transmitter, and blocking direct fluid communication between the low pressure inlet and outlet ports in the zero and calibration settings;
  a second of said separate valve members being a high pressure valve member and permitting direct fluid communication between the high pressure inlet and outlet ports in the run position setting to provide a high fluid pressure directly from the flow line to the transmitter, and blocking direct fluid communication between the high pressure inlet and outlet ports in the zero and calibration settings;
  a calibration inlet port in said body adapted to be selectively connected to a predetermined calibration fluid pressure, a third of said separate valve members being a calibration valve member permitting fluid communication in the calibration setting between the calibration inlet port and the transmitter for calibration of the transmitter at a predetermined fluid pressure.

10. In a differential fluid pressure system including a main flow line in which a differential fluid pressure is to be measured on opposed sides of a flow restriction in the flow line, and a differential pressure transmitter for transmitting to a remote site the differential fluid pressure in said flow line communicated to the transmitter through high and low pressure lines from the main flow line; an improved valve manifold between the transmitter and main flow line connected to said high and low pressure lines to control the fluid pressure flow to the transmitter, said improved valve manifold comprising:
  a body having a central main bore therein;
  a pair of inlet ports communicating with said main bore and connected to high and low pressure lines from the main flow line to provide a low pressure inlet port and a high pressure inlet port;
  a pair of outlet ports communicating with said main bore and connected to high and low pressure lines to said differential pressure transmitter to provide a low pressure outlet port and a high pressure outlet port;

a stem mounted within said bore having an end thereof extending outwardly from said body;

means to rotate said stem among three rotational settings including a run position setting, a zero position setting, and a calibration position setting;

three separate valve members mounted within said bore and operatively connected to said stem for movement upon rotation of the stem among said three settings, one of said separate valve members being a low pressure valve member and permitting direct fluid communication between the low pressure inlet and outlet ports in the run position to permit a low fluid pressure directly from the flow line to the transmitter;

a second of said separate valve members being a high pressure valve member and permitting direct fluid communication between the high pressure inlet and outlet ports in the run position setting to permit a high fluid pressure directly from the flow line to the transmitter; said stem being spaced from the adjacent surfaces defining said bore to form a fluid chamber therebetween in said bore, said valve manifold body having a vent port therein communicating said fluid chamber to atmosphere;

and a third of said valve members having a vent passage therein in continuous fluid communication with said fluid chamber, said vent passage being in fluid communication with said body vent port at the run position setting for venting said fluid chamber to atmosphere at the run position setting thereby to permit detection of any fluid pressure leaks from said high and low pressure lines into said fluid chamber formed by the body bore.

11. In a differential fluid pressure system including a main flow line in which a differential fluid pressure is to be measured, and a differential pressure transmitter for transmitting the differential fluid pressure from the main flow line; an improved valve manifold in high and low pressure lines between the transmitter and main flow line, said improved valve manifold comprising:

a body having a central main bore therein;

a pair of inlet ports communicating with said main bore and connected to high and low pressure lines from the main flow line to provide a low pressure inlet port and a high pressure inlet port;

a pair of outlet ports communicating with said main bore and connected to high and low pressure lines to said differential pressure transmitter to provide a low pressure outlet port and a high pressure outlet port;

a stem mounted within said bore having an end thereof extending outwardly from said body;

means to rotate said stem among three rotational settings including a run position setting, a zero position setting, and a calibration position setting;

three separate valve members mounted within said bore and operatively connected to said stem for movement upon rotation of the stem among said three settings, one of said separate valve members being a low pressure valve member and permitting direct fluid communication between the low pressure inlet and outlet ports in the run position to permit a low fluid pressure directly from the flow line to the transmitter;

a second of said separate valve members being a high pressure valve member and permitting direct fluid communication between the high pressure inlet and outlet ports in the run position setting to permit a high fluid pressure directly from the flow line to the transmitter;

a fluid passage in the manifold between the inlet and outlet ports for the transmitter to permit fluid communication therebetween in said zero position, said first and second valve members blocking fluid communication between said inlet and outlet ports of the transmitter in said run position;

and a third of said valve members having a vent passageway therein in continuous fluid communication with said fluid passage and selectively in fluid communication with atmospheric pressure for venting said fluid chamber to atmosphere at the run position setting thereby to permit detection of any pressure leaks from said high and low pressure lines into said fluid passage.

12. In a fluid pressure differential measuring system having a main flow line in which a fluid pressure differential between two points is desired to be measured, and a pressure differential transmitter for transmitting the fluid pressure differential to a desired location; an improved valve manifold positioned in the fluid pressure lines between the flow line and the measuring instrument for transmitting and regulating the flow of fluid therebetween comprising:

a body having a central main bore therein;

a pair of inlet ports communicating with said main bore and spaced longitudinally of said bore, said ports being connected to high and low fluid pressure lines from said main flow line;

a pair of outlet ports communicating with said main bore and spaced longitudinally of said bore and in alignment transversely of the bore with the pair of inlet ports, and an intermediate calibration port communicating with said main bore and positioned between said pair of outlet ports;

an elongate stem positioned within said main bore and extending outwardly of one end of said body;

said stem having three spherical valve members mounted thereon and spaced along its length, said stem being of an outer diameter less than the diameter of said bore to provide a free bore space between the stem and the inner periphery of said main bore defining a fluid chamber;

said spherical valve members including a pair of end valve members and an intermediate valve member between the end valve members, the end valve members being positioned between the transversely aligned inlet and outlet ports to control the flow of fluid therebetween and the intermediate valve member being positioned at the intermediate port to control fluid flow thereat; and means to rotate the stem and spherical valve members thereon between three distinct rotational settings comprising a run position setting, a zero position setting, and a calibration position setting;

said spherical end valve members having suitable axial bores therethrough alignable in said run position with associated transversely aligned inlet and outlet ports to permit fluid flow from said flow line to said pressure differential transmitter, said end valve members in the zero and calibration settings blocking fluid communication between the associated inlet and outlet ports and said axial bores of said end valve members;

said intermediate spherical valve member permitting fluid communication between said intermediate calibration port and the high pressure outlet port to the pressure differential transmitter in said calibration setting for calibration of the transmitter at a predetermined fluid pressure.

13. In a fluid pressure differential measuring system as set forth in claim 12 wherein said stem has a passageway therein permitting fluid communication between said intermediate calibration port and said high pressure outlet port at said calibration setting.

14. In a fluid pressure differential measuring system as set forth in claim 12 wherein said valve manifold body has a vent port therein in fluid communication with said fluid chamber for selectively venting said fluid chamber to atmosphere, said intermediate spherical valve member blocking the venting of said fluid chamber to atmosphere at said zero setting and permitting the venting of said fluid chamber to atmosphere at said calibration setting.

15. A valve manifold adapted to be positioned between a main flow line and a differential pressure transmitter for regulating the flow of fluid through high and low pressure lines from the main flow line to the transmitter comprising:

a body having a central main bore therein;

a pair of inlet ports communicating with said main bore and spaced longitudinally of said bore, said ports being connected to high and low fluid pressure lines from said main flow line;

a pair of outlet ports communicating with said main bore and spaced longitudinally of said bore and in alignment transversely of the bore with the pair of inlet ports, and an intermediate calibration port communicating with said main bore and positioned between said pair of outlet ports;

an elongate stem positioned within said main bore and extending outwardly of one end of said body;

said stem having three spherical valve members mounted thereon and spaced along its length, said stem being of an outer diameter less than the diameter of said bore to provide a free bore space between the stem and the inner periphery of said main bore defining a fluid chamber;

said spherical valve members including a pair of end valve members and an intermediate valve member between the end valve members, the end valve members being positioned between the transversely aligned inlet and outlet ports to control the flow of fluid therebetween and the intermediate valve member being positioned at the intermediate port to control fluid flow thereat; and means to rotate the stem and spherical valve members thereon between three distinct rotational settings comprising a run position setting, a zero position setting, and a calibration position setting;

said spherical end valve members having suitable axial bores therethrough alignable in said run position with associated transversely aligned inlet and outlet ports to permit fluid flow from said flow line to said pressure differential transmitter, said end valve members in the zero and calibration settings blocking fluid communication between the associated inlet and outlet ports and said axial bores of said end valve members;

said valve manifold body having a vent port therein communicating with said body bore for selectively venting said fluid chamber to atmosphere, said intermediate spherical valve member blocking the venting of said fluid chamber to atmosphere through said vent port at said zero setting and permitting the venting of said fluid chamber to atmosphere through said vent port at said calibration setting.

16. A valve manifold adapted to be positioned between a main flow line and a differential pressure transmitter for regulating the flow of fluid through high and low pressure line from the main flow line to the transmitter comprising:

a body having a main bore therein defining a fluid chamber;

low and high pressure inlet ports in said body connecting with said main bore and adapted to be connected to the main flow line;

low and high pressure outlet ports in said body communicating with said main bore and adapted to be connected to the pressure differential transmitter;

a high pressure calibration port in said body communicating with said main bore and adapted to be connected to a source of a predetermined high pressure calibration fluid;

a separate low pressure calibration port in said body communicating with said main bore and adapted to be connected to a source of a predetermined low pressure calibration fluid;

a stem mounted within said bore and having a purality of separate valve members mounted thereon in spaced relation along the length thereof, said valve members being associated with said ports to control the flow of fluid therethrough upon rotation of the stem;

means to rotate said stem for positioning said valve members among run, zero, and calibration positions;

said valve members when positioned in the run position permitting the alignment of said low and high pressure inlet ports with said low and high pressure outlet ports for the flow of low and high pressure fluids from the main flow line to said pressure differential transmitter;

said valve members when positioned at said calibration position permitting the flow of predetermined high pressure and low pressure calibration fluids to the respective high pressure and low pressure outlet ports thereby to calibrate the transmitter between any desired low pressure and high pressure ranges;

said valve members when positioned in the zero position permitting the alignment of said high pressure inlet port with said low and high pressure outlet ports to said transmitter thereby to provide fluid balancing of said transmitter.

17. A valve manifold as set forth in claim 16 wherein said valve members when positioned in the zero position have a restricted fluid flow passage between said high pressure inlet port and said low and high pressure outlet ports to said transmitter to permit a gradual equalization of pressure on said transmitter.

18. A valve manifold as set forth in claim 16 wherein said low pressure calibration port is a vent to atmosphere in communication with the body bore in the run position to permit the detection of fluid leaks into the body bore from the high and low pressure lines.

19. In a valve manifold between a main flow line and a differential pressure transmitter;
   a body having a main bore therein defining a fluid chamber;
   low and high pressure inlet ports in said body in communication with said bore;
   low and high pressure outlet ports in said body communicating with said main bore and adapted to be connected to the pressure differential transmitter;
   separate low and high pressure calibration ports in said body each adapted to be connected to a source of calibration fluid of a predetermined fluid pressure;
   a stem mounted within said bore having an end thereof extending outwardly from said body, a plurality of spaced valve elements mounted within the bore along the stem and associated with said ports to control the flow of fluid therethrough upon rotation of the stem;
   means to rotate said stem for positioning said valve elements among run, zero, and calibration positions;
   said valve elements when positioned in the run position permitting the alignment of said low and high pressure inlet ports with said low and high pressure outlet ports;
   said valve elements when positioned in the zero position having a restricted flow passage between said high pressure inlet port and said low and high pressure outlet ports to said transmitter, thereby to provide a relatively slow equalization of pressure on said transmitter;
   said vlave elements when positioned at said calibration position permitting the flow of the calibration fluids of selected fluid pressures to said low and high pressure outlet ports.

20. In a valve manifold as set forth in claim 19 wherein either of said predetermined low pressure or high pressure calibration fluids may be atmospheric.

21. In a differential fluid pressure system including a main flow line in which a differential fluid pressure is to be measured on opposed sides of a flow restriction in the flow line, and a differential pressure transmitter adapted for transmitting to a remote site the differential fluid pressure in said flow line communicated to the transmitter through high and low pressure lines from the main flow line; an improved valve manifold between the transmitter and main flow line connected to said high and low pressure lines to control the fluid pressure flow to the transmitter, said improved valve manifold comprising:
   a body having a central main bore therein;
   a pair of inlet ports communicating with said main bore and connected to high and low pressure lines from the main flow line to provide a low pressure inlet port and a high pressure inlet port;
   a pair of outlet ports communicating with said main bore and connected to high and low pressure lines to said differential pressure transmitter to provide a low pressure outlet port and a high pressure outlet port; a calibration port in said body adapted to be connected to a source of calibration fluid of a predetermined pressure;
   a stem mounted within said bore having an end thereof extending outwardly from said body;
   means to rotate said stem among three rotational settings including a run position setting, a zero positon setting, and a calibration position setting;
   a plurality of valve members mounted within said bore and operatively connected to said stem for movement upon rotation of the stem among said three settings, said valve members permitting direct fluid communication between the low pressure inlet and outlet ports in the run position to permit a low fluid pressure directly from the flow line to the transmitter, said valve members permitting direct fluid communication between the high pressure inlet and outlet ports in the run position setting to permit a high fluid pressure directly from the flow line to the tramsmitter, said valve members when positioned at said calibration position setting permitting the flow of calibration fluid to said high pressure outlet port;
   said stem being spaced from the adjacent surfaces defining said bore to form a fluid chamber therebetween in said bore, said valve manifold body having a vent port therein communicating said fluid chamber to atmosphere; and
   one of said valve members having a vent passage therein in continuous fluid communication with said fluid chamber, said vent passage being in fluid communication with said body vent port at the run position setting for venting said fluid chamber to atmosphere at the run position setting;
   said valve members when positioned in the zero position permitting the alignment of said high pressure inlet port with said low and high pressure outlet ports to said transmitter thereby permitting fluid balancing of said transmitter.

* * * * *